United States Patent [19]

Parker et al.

[11] Patent Number: 4,833,504
[45] Date of Patent: May 23, 1989

[54] SINGLE PASS HIGHLIGHT COLOR PRINTER INCLUDING A SCAVENGELESS DEVELOPER HOUSING

[75] Inventors: Delmer G. Parker, Rochester; William M. Allen, Jr., Webster, both of N.Y.

[73] Assignee: Xerox Corporation, Stamford, Conn.

[21] Appl. No.: 95,486

[22] Filed: Aug. 31, 1987

[51] Int. Cl.⁴ .................... G03G 15/01; G03G 15/09
[52] U.S. Cl. .................................. 355/326; 355/253; 118/645; 118/658
[58] Field of Search ................ 355/4, 3 DD, 14 D; 118/645, 657–658; 430/42, 45, 122

[56] References Cited

U.S. PATENT DOCUMENTS

| | | | |
|---|---|---|---|
| 3,457,900 | 7/1969 | Drexler | 118/658 |
| 3,900,001 | 8/1975 | Fraser et al. | 118/658 |
| 4,078,929 | 3/1978 | Gandlach | 430/42 |
| 4,308,821 | 1/1982 | Matsumoto et al. | 430/45 X |
| 4,465,356 | 8/1984 | Joseph et al. | 355/4 X |
| 4,486,089 | 12/1984 | Itaya et al. | 355/3 DD |

Primary Examiner—Arthur T. Grimley
Assistant Examiner—J. Pendegrass

[57] ABSTRACT

A magnetic brush developer apparatus comprising a plurality of developer housings each including a plurality of magnetic rolls associated therewith. The magnetic rolls disposed in a second developer housing are constructed such that the radial component of the magnetic force field produces a magnetically free development zone intermediate a charge retentive surface and the magnetic rolls. The developer is moved through the zone magnetically unconstrained and, therefore, subjects the image developed by the first developer housing to minimal disturbance. Also, the developer is transported from one magnetic roll to the next. This apparatus provides an efficient means for developing the complimentary half of a tri-level latent image while at the same time allowing the already developed first half to pass through the second housing with minimum image disturbance.

9 Claims, 3 Drawing Sheets

SINGLE PASS HIGHLIGHT COLOR PRINTER INCLUDING A SCAVENGELESS DEVELOPER HOUSING

BACKGROUND OF THE INVENTION

This invention relates generally to the rendering of latent electrostatic images visible using multiple colors of dry toner or developer and more particularly to a developer apparatus including a plurality of developer housings which minimizes scavenging and re-development of the first developed image by successive developer housings.

The invention can be utilized in the art of xerography or in the printing arts. In the practice of conventional xerography, it is the general procedure to form electrostatic latent images on a xerographic surface by first uniformly charging a photoconductive insulating surface or photoreceptor. The charge is selectively dissipated in accordance with a pattern of activating radiation corresponding to original images. The selctive dissipation of the charge leaves a latent charge pattern on the imaging surface corresponding to the areas not struck by radiation.

This charge pattern is made visible by developing it with toner. The toner is generally a colored powder which adheres to the charge pattern by electrostatic attraction.

The developed image is then fixed to the imaging surface or is transferred to a receiving substrate such as plain paper to which it is fixed by suitable fusing techniques.

The concept of tri-level xerography is described in U.S. Pat. No. 4,078,929 issued in the name of Gundlach. The patent to Gundlach teaches the use of tri-level xerography as a means to achieve single-pass highlight color imaging. As disclosed therein the charge pattern is developed with toner particles of first and second colors. The toner particles of one of the colors are positively charged and the toner particles of the other color are negatively charged. In one embodiment, the toner particles are supplied by a developer which comprises a mixture of triboelectrically relatively positive and relatively negative carrier beads. The carrier beads support, respectively, the relatively negative and relatively positive toner particles. Such a developer is generally supplied to the charge pattern by cascading it across the imaging surface supporting the charge pattern. In another embodiment, the toner particles are presented to the charge pattern by a pair of magnetic brushes. Each brush supplies a toner of one color and one charge. In yet another embodiment, the development system is biased to about the background voltage. Such biasing results in a developed image of improved color sharpness.

In tri-level xerography as taught by Gundlach, the xerographic contrast on the charge retentive surface or photoreceptor is divided three, rather than two, ways as is the case in conventional xerography. The photoreceptor is charged, typically to 900v. It is exposed imagewise, such that one image corresponding to charged image areas (which are subsequently developed by charged area development, i.e. CAD) stays at the full photoreceptor potential ($V_{cad}$ or $V_{ddp}$). The other image is exposed to discharge the photoreceptor to its residual potential, i.e. $V_{dad}$ or $V_c$ (typically 100v) which corresponds to discharged area images that are subsequently developed by discharged-area development (DAD) and the background areas exposed such as to reduce the photoreceptor potential to halfway between the $V_{cad}$ and $V_{dad}$ potentials, (typically 500v) and is referred to as $V_{white}$ or $V_w$. The CAD developer is typically biased about 100v closer to $V_{cad}$ than $V_{white}$ (600v), and the DAD developer system is biased about 100v closer to $V_{dad}$ than $V_{white}$ (about 400v).

When using conventional magnetic brush developer structures for development of images subsequent to the first developed image it has been observed that scavenging and re-development of the first developed image results.

It is known in the art to alter the magnetic properties of the magnetic brush in the second housing in order to obviate the foregoing problem. For example, there is disclosed in U.S. Pat. No. 4,308,821 granted on Jan. 5, 1982 to Matsumoto, et al, an electrophotographic development method and apparatus using two magnetic brushes for developing two-color images which do not disturb or destroy a first developed image during a second development process. This is because a second magnetic brush contacts the surface of a latent electrostatic image bearing member more lightly than a first magnetic brush and the toner scraping force of the second magnetic brush is reduced in comparison with that of the first magnetic brush by setting the magnetic flux density on a second non-magnetic sleeve with an internally disposed magnet smaller than the magnetic flux density on a first magnetic sleeve, or by adjusting the distance between the second non-magnetic sleeve and the surface of the latent electrostatic image bearing members. Further, by employing toners with different quantity of electric charge, high quality two-color images are obtained.

U.S. Pat. No. 3,457,900 discloses the use of a single magnetic brush for feeding developer into a cavity formed by the brush and an electrostatic image bearing surface faster than it is discharged thereby creating a roll-back of developer which is effective in toning an image. The magnetic brush is adapted to feed faster than it discharges by placement of strong magnets in a feed portion of the brush and weak magnets in a discharge portion of the brush.

U.S. Pat. No. 3,900,001 discloses an electrostatographic developing apparatus utilized in connection with the development of conventional xerographic images. It is utilized for applying developer material to a developer receiving surface in conformity with an electrostatic charge pattern wherein the developer is transported from the developer supply to a development zone while in a magnetic brush configuration and thereafter, transported through the development zone in magnetically unconstrained blanket contact with the developer receiving surface.

As disclosed in U.S. Pat. No. 4,486,089 granted on Dec. 4, 1984 to Itaya, et.al. a magnetic brush developing apparatus for a xerographic copying machine or electrostatic recording machine has a sleeve in which a plurality of magnetic pieces are arranged in alternating polarity. Each piece has a shape which produces two or more magnetic peaks. The sleeve and the magnets are rotated in opposite directions. As a result of the above, it is alleged that a soft developer body is obtained, and density unevenness or stripping of the image is avoided.

BRIEF SUMMARY OF THE INVENTION

Briefly, the present invention uses a magnetic brush developer apparatus comprising a plurality of developer housings each including a plurality of magnetic rolls associated therewith. The magnetic rolls disposed in a second developer housing are constructed such that the radial and tangential components of the magnetic force field produces a magnetically free development zone intermediate a charge retentive surface and the magnetic rolls. The developer is moved through the zone magnetically unconstrained and, therefore, subjects the image developed by the first developer housing to minimal disturbance. Also, the developer is transported from one magnetic roll to the next. This apparatus provides an efficient means for developing the complimentary half of a tri-level latent image while at the same time allowing the already developed first half to pass through the second housing with minimum image disturbance.

DETAILED DESCRIPTION OF THE PREFERRED EMBODIMENT OF THE INVENTION

Figure 1A:
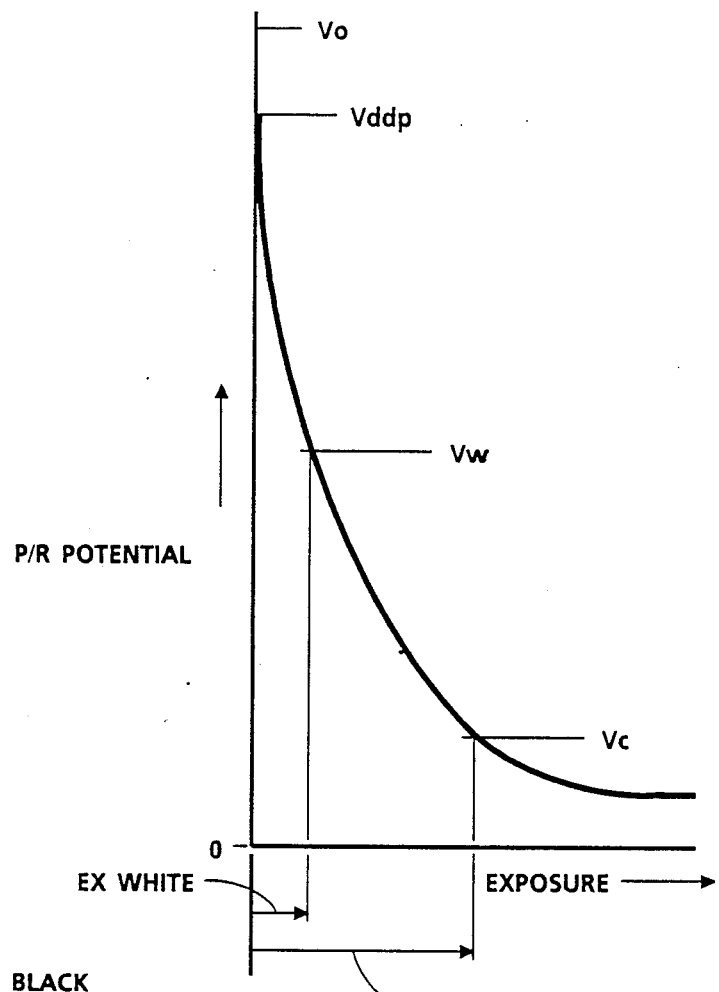
FIG. 1a is a plot of photoreceptor potential versus exposure illustrating a tri-level electrostatic latent image.
Figure 1B:
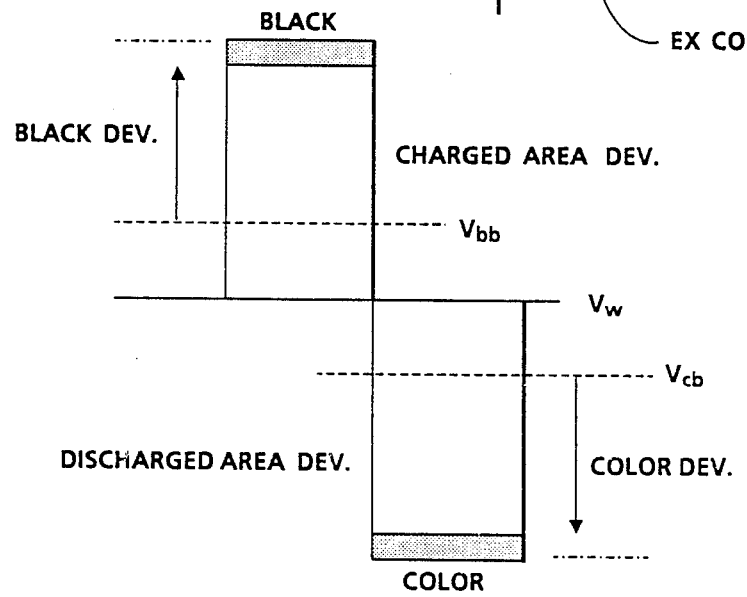
FIG. 1b is a plot of photoreceptor potential illustrating single-pass, highlight color latent image characteristics.

For a better understanding of the concept of tri-level imaging, a description thereof will now be made with reference to FIGS. 1a and 1b. FIG. 1a illustrates the tri-level electrostatic latent image in more detail. Here $V_o$ is the initial charge level, $V_{ddp}$ the dark discharge potential (unexposed), $V_w$ the white discharge level and $V_c$ the photoreceptor residual potential (full exposure).

Color discrimination in the development of the electrostatic latent image is achieved by passing the photoreceptor through two developer housings in tandem which housings are electrically biased to voltages which are offset from the background voltage $V_w$, the direction of offset depending on the polarity or sign of toner in the housing. One housing (for the sake of illustration, the first) contains developer with black toner having triboelectric properties such that the toner is driven to the most highly charged ($V_{ddp}$) areas of the latent image by the electric field between the photoreceptor and the development rolls biased at $V_{bb}$ (V black bias) as shown in FIG. 1b. Conversely, the triboelectric charge on the colored toner in the second housing is chosen so that the toner is urged towards parts of the latent image at residual potential, $V_c$ by the electric field existing between the photoreceptor and the development rolls in the second housing at bias voltage $V_{cb}$ (V color bias).

Figure 2:
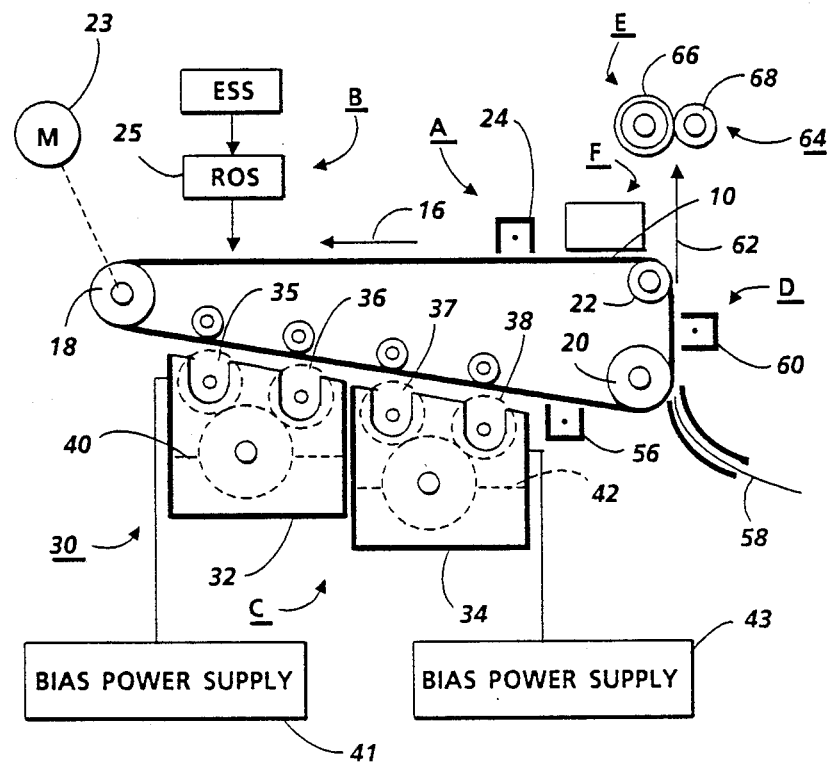
FIG. 2 is schematic illustration of a printing apparatus incorporating the inventive features of our invention.

As shown in FIG. 2, a printing machine incorporating our invention may utilize a charge retentive member in the form of a photoconductive belt 10 consisting of a photoconductive surface and an electrically conductive substrate and mounted for movement past a charging station A, an exposure B, developer stations C, transfer station D and cleaning station F. Belt 10 moves in the direction of arrow 16 to advance successive portions thereof sequentially through the various processing stations disposed about the path of movement thereof. Belt 10 is entrained about a plurality of rollers 18, 20 and 22, the former of which can be used as a drive roller and the latter of which can be used to provide suitable tensioning of the photoreceptor belt 10. Motor 23 rotates roller 18 to advance belt 10 in the direction of arrow 16. Roller 18 is coupled to motor 23 by suitable means such as a belt drive.

As can be seen by further reference to FIG. 2, initially successive portions of belt 10 pass through charging station A. At charging station A, a corona discharge device such as a scorotron, corotron or dicorotron indicated generally by the reference numeral 24, charges the belt 10 to a selectively high uniform positive or negative potential, $V_o$. Preferably charging is negative. Any suitable control, well known in the art, may be employed for controlling the corona discharge device 24.

Next, the charged portions of the photoreceptor surface are advanced through exposure station B. At exposure station B, The uniformly charged photoreceptor or charge retentive surface 10 is exposed by a laser based output scanning device 25 which causes the charge retentive surface to be discharged in accordance with the output from the scanning device. Preferably the scanning device is a three level laser Raster Output Scanner (ROS). Alternatively, the ROS could be replaced by a conventional xerographic exposure device.

The photoreceptor, which is initially charged to a voltage $V_o$, undergoes dark decay to a level $V_{ddp}$. When exposed at the exposure station B it is discharged to $V_w$ imagewise in the background (white) image areas and to $V_c$ which is near zero or ground potential in the highlight (i.e. color other than black) color parts of the image. See FIG. 1a.

At development station C, a magnetic brush development system, indicated generally by the reference numeral 30 advances developer materials into contact with the electrostatic latent images. The development system 30 comprises first and second developer structures or housings 32 and 34. Preferably, each magnetic brush development housing includes a pair of magnetic brush developer structures herein disclosed as rollers. Thus, the housing 32 contains a pair of rollers 35, 36 while the housing 34 contains a pair of magnetic brush rollers 37, 38. Each pair of rollers advances its respective developer material into contact with the latent image. Appropriate developer biasing is accomplished via power supplies 41 and 43 electrically connected to respective developer housings 32 and 34.

Color discrimination in the development of the electrostatic latent image is achieved by passing the photoreceptor past the two developer housings 32 and 34 in a single pass with the magnetic brush rolls 35, 36, 37 and 38 electrically biased to voltages which are offset from the background voltage $V_w$, the direction of offset depending on the polarity of toner in the housing. One housing e.g. 32 (for the sake of illustration, the first) contains developer with black toner 40 having triboelectric properties such that the toner is driven to the most highly charged ($V_{ddp}$) areas of the latent image by the electrostatic field (development field) between the photoreceptor and the development rolls biased at $V_{bb}$ as shown in FIG. 1b. Conversely, the triboelectric charge on colored toner 42 in the second housing is chosen so that the toner is urged towards parts of the latent image at residual potential, $V_c$ by the electrostatic field (development field) existing between the photoreceptor and the development rolls in the second housing at bias voltages $V_{cb}$.

In tri-level xerography, the entire photoreceptor voltage difference ($|V_{ddp}-V_c|$, as shown in FIG. 1a) is shared equally between the charged area development (CAD) and the discharged area development (DAD). This corresponds to $\approx 800$ volts (if a realistic photoreceptor value for $V_{ddp}$ of 900 volts and a residual discharge voltage of 100 volts are assumed). Allowing an additional 100 volts for the cleaning field in each development housing ($|V_{bb}-V_{white}|$ or $|V_{white}-V_{cb}|$) means an actual development contrast voltage for CAD of $\approx$ 300 volts and an $\approx$ equal amount for DAD. In the foregoing case the 300 volts of contrast voltage is provided by electrically biasing the first developer housing to a voltage level of approximately 600 volts and the second developer housing to a voltage level of 400 volts.

A sheet of support material 58 is moved into contact with the toner image at transfer station D. The sheet of support material is advanced to transfer station D by conventional sheet feeding apparatus, not shown. Preferably, sheet feeding apparatus includes a feed roll contacting the uppermost sheet of a stack copy sheets. Feed rolls rotate so as to advance the uppermost sheet from stack into a chute which directs the advancing sheet of support material into contact with photoconductive surface of belt 10 in a timed sequence so that the toner powder image developed thereon contacts the advancing sheet of support material at transfer station D.

Because the composite image developed on the photoreceptor consists of both positive and negative toner, a pre-transfer corona discharge member 56 is provided to condition the toner for effective transfer to a substrate using corona discharge.

Transfer station D includes a corona generating device 60 which sprays ions of a suitable polarity onto the backside of sheet 58. This attracts the charged toner powder images from the belt 10 to sheet 58. After transfer, the sheet continues to move, in the direction of arrow 62, onto a conveyor (not shown) which advances the sheet to fusing station E.

Fusing station E includes a fuser assembly, indicated generally by the reference numeral 64, which permanently affixes the transferred powder image to sheet 58. Preferably, fuser assembly 64 comprises a heated fuser roller 66 and a backup roller 68. Sheet 58 passes between fuser roller 66 and backup roller 68 with the toner powder image contacting fuser roller 66. In this manner, the toner powder image is permanently affixed to sheet 58. After fusing, a chute, not shown, guides the advancing sheet 58 to catch tray, also not shown, for subsequent removal from the printing machine by the operator.

After the sheet of support material is separated from photoconductive surface of belt 10, the residual toner particles carried by the non-image areas on the photoconductive surface are removed therefrom. These particles are removed at cleaning station F.

Subsequent to cleaning, a discharge lamp (not shown) floods the photoconductive surface with light to dissipate any residual electrostatic charge remaining prior to the charging thereof for the successive imaging cycle.

The magnetic brush rolls 35 and 36 may comprise any conventional structures known in the art that provide a magnetic field that forms or constrains the developer material in the housing 32 into a brush-like configuration in the development zone between the rolls 35 and 36 and the charge retentive surface. This arrangement effects development of one of the two tri-level images contained on the charge retentive surface in a well-known manner. Thus, the developer material is moved through the development zone in a constrained fashion.

The magnetic brush rolls 37 and 38 on the other hand are constructed such that development of the other of the two tri-level image is accomplished with minimal disturbance of the first image. To this end, the magnetic rolls 37 and 38 comprise magnetic force fields as depicted in FIGS. 3a and 3b, respectively. As shown therein, the radial force profiles of the these two rolls are such as to cause developer to be picked up from the developer housing 34 and conveyed to the top of the roll 37 where the developer becomes magnetically unconstrained. The developer is moved through the development zone in a magnetically unconstrained manner until it is attracted to the roll 38 due to the radial magnetic forces of that roll. Magnetic poles are designated N (north) or S (south). Radial magnetic forces are depicted with solid lines and tangential forces are depicted with dashed lines. As will be appreciated, the rolls 35 and 36 may be fabricated in the same manner as the rolls 37 and 38. Such a construction of rolls 35 and 36 would render them less likely to disturb the latent image which is subsequently developed by the rolls 37 and 38.

Figure 3:
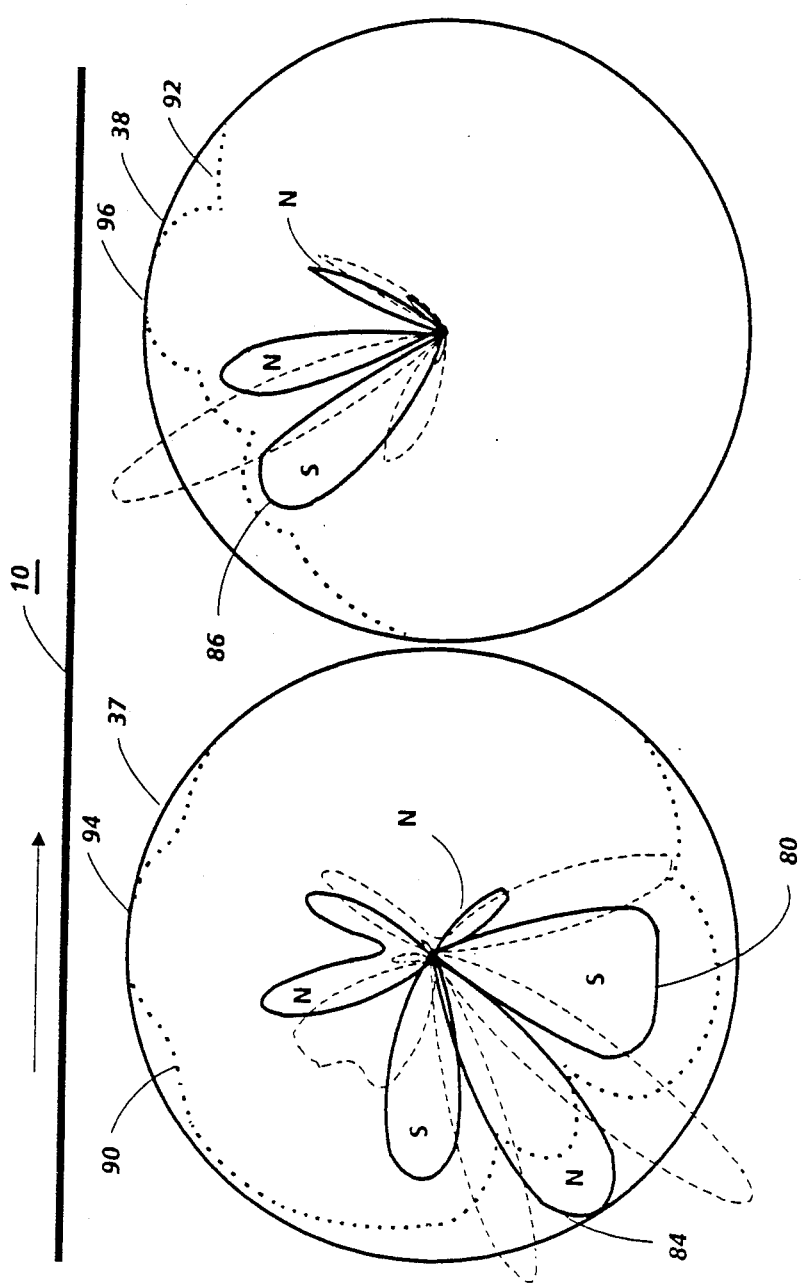
FIG. 3 is a plot of the magnetic fields around the central axis of a two-roll magnetic brush development system incorporated in printing apparatus of FIG. 2.

As illustrated in FIG. 3 of the drawings, the magnetic fields are plotted around the central axis of a two-roll magnetic brush development system such as the one comprising rolls 37, 38. For a multiple roll development system comprising more than two rolls, roll 38 is replicated. The rolls are driven synchronously in this example, although it is also possible to have independent drive mechanisms for each roller.

The development system additionally consists of a sump, or reservoir, of magnetic developer material, and optionally a mixing system, paddle wheel, or other apparatus to maintain the developing properties of the material in the sump. The developer rolls are rotating non-magnetic cylinders or shells having roughened or longitudinally corrugated surfaces to urge the developer along by frictional forces around fixed internal magnets. The shells are driven synchronously in this example; it is also possible to have independent drive mechanisms for each roller.

During the development process of the system, the direction of rotation of the shell around either fixed magnet is clockwise. However, the system can also be configured to develop in the counterclockwise direction with no compromise in performance, depending on the desired properties of the development system with respect to the direction of the photoreceptor (i.e., against-mode or with-mode development).

In the case described, the photoreceptor 10 is located above the development rolls. The developer materials are transported in the direction of the arrow from the sump to roll 37, to roll 38, back to the sump.

A broad radial pole 80 of roll 37 (FIG. 3) positioned at 6 o'clock seves to lift magnetic developer material from a donor roll in the sump or housing 32. The combination of tangential and radial fields starting with pole 84 transport the developer material along the surface of the developer roll until about the 11 o'clock position of roll 37. At that point, the developer becomes magnetically unconstrained due to the lack of poles or strong poles in this area to constrain the developer in a brush-like configuration.

The developer is moved magnetically unconstrained through the part of the development zone delineated by the roll 37 and the charge retentive surface until the developer comes under the influence of a strong radial south pole 86 of the magnet 38. Movement through the aforementioned zone is effected through the cooperation of the charge retentive surface and the developer shell. The pole 86 serves to effect transition of the developer from the roll 37 to the roll 38 without magnetically constraining the developer so as to cause scavenging of the first image as it passes the second developer housing. As will be observed, the poles following the pole 86 in the clockwise direction are progressively weaker so that the developer is magnetically unconstrained as it moves through the part of the development zone delineated by the roll 38 and the charge retentive surface.

Dotted lines 90 and 92 delineate the magnitude of the magnetic force on the developer particles at the various positons around the shell. The direction of the force is toward the center of the rolls. In accordance with the invention, the force on the developer is at a minimum in the nip area between the rolls 37 and 38 as indicated at 94 and 96 on the dotted lines 90 and 92, respectively.

What is claimed is:

1. Apparatus for forming two different types of images on a charge retentive surface, said apparatus comprising:
   a pair of developer structures, one for developing a first image a first color and one for developing a second image a second color, said pair of developer structures being positioned adjacent said charge retentive surface such that said first and second images are developed sequentially;
   at least two roll structures, each including an member supported for rotation and a stationarily supported member in each of said developer structures and spaced a predetermined distance apart;
   means for effecting rotation of said rolls;
   said at least two roll structures in the developer structure for developing said second image being spaced from said charge retentive surface a predetermined distance to form a development zone and having magnetic field components which are oriented in such a manner that developer is moved magnetically unconstrained through said development zone while being passed from one roll structure to the next roll structure, said next roll structure having a strong radial pale and being closely positioned relative to said one roll structure whereby movement of developer is effected directly from said one roll structure to said next roll 2. Apparatus according to claim 1 wherein said at least two roll structures for developing said first image have a magnetic force field which magnetically constrains the developer as it moves through the development zone whereby a brush-like structure is formed.

3. Apparatus according to claim 2 wherein said two different types of images are different color images.

4. Apparatus according to claim 1 wherein said two different kinds of images are different color images.

5. Developer apparatus for forming two different kinds of images, said apparatus comprising:
   a pair of developer structures, one for developing a first image a first color and one for developing a second image a second color, said pair of developer structures being positioned adjacent said charge retentive surface such that said first and second images are developed sequentially;
   at least two roll structures, each including an member supported for rotation and a stationarily supported member in each of said developer structures and spaced a predetermined distance apart;
   means for effecting rotation of said rolls;
   the at least two roll structures in the developer structure for developing said second image being spaced from said charge retentive surface a predetermined distance to form a development zone and and having magnetic field components which are oriented in such a manner that developer is moved magnetically unconstrained through said development zone while being passed from one roll structure to the next roll structure, said next roll structure having a strong radial role and being closely positioned relative to said one roll structure whereby movement of developer is effected directly from said one roll structure to said next roll.

6. Apparatus according to claim 5 wherein said at least two roll structures for developing said first image have a magnetic force field which magnetically constrains the developer as it moves through the development zone whereby a brush-like structure is formed.

7. Apparatus according to claim 5 wherein said two different kinds of images are different color images.

8. Apparatus for forming two different types of images on a charge retentive surface, said apparatus comprising:
   a pair of developer structures, one for developing a first image a first color and one for developing a second image a second color, said pair of developer structures being positioned adjacent said charge retentive surface such that said first and second images are developed sequentially;
   at least two roll structures, each including a member supported for rotation and a stationarily supported member, in each of said developer structures and spaced a predetermined distance apart;
   means for effecting rotation of said rolls;
   said at least two roll structures in the developer structure for developing said second image being spaced from said charge retentive surface predetermined distance to form a development zone and spaced from each other and having magnetic field components which are oriented in such a manner that developer is moved magnetically unconstrained through said development zone while being passed from one roll structure to the next while contacting the charge retentive surface, one of said at least two roll structures having a broad radial pole remote from said development zone for lifting developer from a sump, a plurality of poles able to magnetically constrain the developer and move it around the surface of said one of said at least two roll structures to a position juxtaposed said development zone and poles in said development zone which move developer magnetically unconstrained through a portion of said development zone and the other of said two roll structures having a strong radial pole positioned in said development zone for attracting developer without magnetically constraining it and additional poles for moving the developer through another portion of said development zone.

9. Developer apparatus for forming two different kinds of images, said apparatus comprising:
a pair of developer structures, one for developing a first image a first color and one for developing a second image a second color, said pair of developer structures being positioned adjacent said charge retentive surface such that said first and second images are developed sequentially;
at least two roll structures, each including a member supported for rotation and a stationarily supported member, in each of said developer structures and spaced a predetermined distance apart;
means for effecting rotation of said rolls;
the at least two roll structures in the developer structure for developing said second image being spaced from said charge retentive surface a predetermined distance to form a development zone and spaced from each other and having magnetic field components which are oriented in such a manner that developer is moved magnetically unconstrained through said development zone while being passed from one roll structure to the next while contacting the charge retentive surface, one of said at least two roll structures having a broad radial pole remote from said development zone for lifting developer from a sump, a plurality of poles able to magnetically constrain the developer and move it around the surface of said one of said at least two roll structures to a position juxtaposed said development zone and poles in said development zone which move developer magnetically unconstrained through a portion of said development zone and the other of said two roll structures having a strong radial pole positioned in said development zone for attracting developer without magnetically constraining it and additional poles for moving the developer through another portion of said development zone.

* * * * *